United States Patent
Niehoff

(10) Patent No.: US 8,419,420 B2
(45) Date of Patent: Apr. 16, 2013

(54) BURNER

(75) Inventor: Thomas Niehoff, Markt Indersdorf (DE)

(73) Assignee: Linde Aktiengesellschaft (DE)

(*) Notice: Subject to any disclaimer, the term of this patent is extended or adjusted under 35 U.S.C. 154(b) by 169 days.

(21) Appl. No.: 13/186,502

(22) Filed: Jul. 20, 2011

(65) Prior Publication Data
US 2012/0189965 A1    Jul. 26, 2012

(30) Foreign Application Priority Data

Jul. 22, 2010 (DE) .......................... 10 2010 031 927
Oct. 23, 2010 (EP) ..................................... 10013905

(51) Int. Cl.
*F23D 1/02* (2006.01)

(52) U.S. Cl.
USPC ...... 431/8; 431/9; 431/10; 431/354; 431/181; 431/187

(58) Field of Classification Search .................. 431/9, 8, 431/10, 187, 181, 354, 350, 353
See application file for complete search history.

(56) References Cited

U.S. PATENT DOCUMENTS

| 5,871,343 A * | 2/1999 | Baukal et al. ................... 431/10 |
| 7,303,388 B2 * | 12/2007 | Joshi et al. ....................... 431/10 |
| 8,297,969 B2 * | 10/2012 | Daneri et al. .................. 431/284 |
| 2007/0254251 A1 * | 11/2007 | Cao et al. ........................ 431/10 |

FOREIGN PATENT DOCUMENTS

| AT | 411 928 B | 7/2004 |
| DE | 11 51 266 B | 7/1963 |

* cited by examiner

*Primary Examiner* — Alfred Basichas
(74) *Attorney, Agent, or Firm* — Joshua L. Cohen

(57) ABSTRACT

A burner includes a first fuel feed and a first oxidant feed surrounding the first fuel feed in the shape of a ring. The burner includes a second fuel feed arranged about the first oxidant feed in the shape of a ring, and a second oxidant feed arranged about the second fuel feed in the shape of a ring. In addition, a plurality of oxygen lances are provided, which have a smaller radial distance from the burner centre than the second fuel feed.

12 Claims, 1 Drawing Sheet

BURNER

The invention relates to a burner with a first fuel feed and with a first oxidant feed surrounding the first fuel feed in the shape of a ring. Furthermore, the invention relates to a method for the chemical conversion of a fuel with an oxygen-containing gas by means of a burner, wherein the fuel is fed in via the burner and converted with a first flow of an oxygen-containing gas surrounding the fuel flow.

During the combustion of a fuel gas with an oxygen-containing gas in externally mixing burners, that is in burners in which the fuel gas and the oxygen-containing gas are not pre-mixed but separately conducted in a mixing zone and ignited therein, it is important to achieve an intensive mixing of the oxygen-containing gas and of the fuel gas in order to accelerate the chemical combustion reaction between these gases and obtain a stable flame. This is particularly true when low-calorific fuels are employed.

Thus, with burners operated with solid or liquid fuels, problems occur with the flame stability and the burnout, that is the complete combustion, of the fuel. The flame detaches or is unstable and thus does not make safe operation. Depending on the operating mode, the flame characteristic changes substantially. A safe setting of the flame with different burner outputs and fuels is hardly possible.

SUMMARY OF THE INVENTION

The object of the present invention therefore is to develop a burner and a method for the chemical conversion of gases, wherein the abovementioned problems regarding the flame stability and burnout are preferably avoided.

This object is solved through a burner with a first fuel feed and with a first oxidant feed surrounding the fuel feed in the shape of a ring, which is characterized in that a second fuel feed is provided, which is arranged in the shape of a ring about the first oxidant feed, and in that a second oxidant feed is provided, which is arranged about the second fuel feed in the shape of a ring, and wherein two or more oxygen lances are provided, which have a smaller radial distance from the burner centre than the second fuel feed.

The method includes the chemical conversion of a fuel with an oxygen-containing gas by means of a burner according to the invention, wherein the fuel is fed in via the burner and converted with a first flow of an oxygen-containing gas surrounding the fuel flow and is characterized in that a second fuel flow is provided which surrounds the first oxygen-containing flow as envelope flow, and in that a second oxygen-containing flow is provided which surrounds the second fuel flow as envelope flow, and wherein into the first oxygen-containing flow two or more additional oxygen flows are nozzle-injected.

As oxidant an oxygen-containing gas is used, preferentially air, air enriched with oxygen, a mixture of oxygen and carbon dioxide or a mixture of oxygen, carbon dioxide and air. In an embodiment of the invention a carbon dioxide flow is mixed with oxygen as oxidant, so that its oxygen content is between 15% by volume and 25% by volume.

The method acquires special significance in that the oxygen content can be simply adapted to changed fuel conditions (calorific value, composition, moisture).

The burner according to the invention is suitable for fuels of all types—solid, liquid or gaseous fuels. In particular, the burner is suitable for the combustion of low-calorific fuels, particularly of solids such as for example brown coal, pit coal, wood or wood chips and fuels extracted from biomass and bio-fuels such as for example vegetable oil, bio-diesel, bio-ethanol or bio-methane. The burner according to the invention can also be operated with mixtures of the abovementioned fuels, for example with coal and wood.

The fuel in this case can be fed as a mixture of both via the first fuel feed as well as via the second fuel feed. It is likewise possible to provide a fuel type via the one fuel feed and another fuel type via the other fuel feed.

The term "low-calorific fuels" means fuels which have a lower calorific value than natural gas. Examples for low-calorific fuels are gaseous fuels with a calorific value of less than 10 kwh/$m^3$, less than 8 kwh/$m^3$ or less than 5 kwh/$m^3$, or solid or liquid fuels with a calorific value under 30 MJ/kg.

The first and the second oxidant feed are connected with means for the supply with an oxygen-containing gas, particularly pure oxygen, air, carbon dioxide or a mixture of two or more of these substances. Means for the supply with a fuel either gaseous, liquid or solid are connected to the first and the second fuel feed. The oxygen lances are connected to an oxygen source which supplies a gas with an oxygen content of more than 21% by volume, a gas with an oxygen content of more than 75% by volume, a gas with an oxygen content of more than 90% by volume or technically pure oxygen.

According to the invention, the fuel feed is divided in two: a part of the fuel exits the burner via a first fuel feed centrally arranged in the burner head. A second part of the fuel is fed in via a ring-shaped second fuel feed which surrounds the first fuel feed. Apportioning the fuels to the two fuel feeds is preferentially effected such that more fuel is fed in via the first fuel feed than via the second fuel feed. Particularly, the ratio of the fuel quantity fed in via the first fuel feed to the fuel quantity fed in via the second fuel feed is between 4:1 and 1.3:1, or between 2.5:1 and 1.5 to 1.

Between the two fuel feeds there is located a likewise ring-shaped first oxidant feed via which an oxidant, which reacts with the fuel and chemically converts said fuel, is fed in. A second oxidant feed surrounds the second fuel feed in the shape of a ring. Advantageously, more oxidant is fed in via the second oxidant feed than via the first oxidant feed, particularly 1.2 to 2 times the oxidant quantity fed in via the first oxidant feed.

The first and second fuel feed as well as the first and second oxidant feed are preferably arranged coaxially to each other. Instead of the parallel guidance of the fuel and oxidant flow, the fuel and the oxidant can also be joined at a certain angle in order to improve the intermixing of the flows.

In addition, a plurality of oxygen lances are provided which have a smaller radial spacing from the burner centre than the second fuel feed. The oxygen lances are arranged in the region within the wall radially delimiting the second fuel feed to the inside. The oxygen lances are located within the ring channel forming the first oxidant feed and particularly on the radially inner edge or on the radially outer edge of said ring channel. However, the oxygen lances can also be provided within the central first fuel feed, such as on its outer edge.

Advantageously the oxygen lances are orientated parallel to the first oxygen means feed. Oxygen fed in via the oxygen lances flows parallel to the fuel exiting from the first fuel feed.

By way of the oxygen lances, an oxygen-containing gas having an oxygen content of more than 90% by volume, particularly more than 95% by volume, or being technically pure oxygen, is fed in.

Through the division into two of the fuel feeds according to the invention, the division of the oxidant feed into two flows, and the possibility of feeding in additional oxygen via the oxygen lances, the combustion control and the flame stability are substantially improved. Additional oxygen can be added via the oxygen lances as required. If, for example, a highly carbon dioxide-containing mixture of oxygen and carbon dioxide is fed in via the first oxidant feed having a low oxygen content of for example less than 20% by volume, technically pure oxygen is nozzle-injected via the oxygen lances in order to provide the overall oxygen quantity necessary for the combustion of the fuel.

Through the division of the fuel into two separate feeds according to the invention and through the allocation of the oxidant to two feeds and the additional nozzle-injection of oxygen, the burner according to the invention allows the setting of different flame geometries and flame lengths with different burner outputs. The heat distribution in the burner flame can be specifically selected.

The second fuel feed and/or the second oxidant feed and/or the oxygen lances comprise means for creating a swirl. A swirl flow can thus be imposed on a fuel flowing through the second fuel feed or a gas flowing through the second oxidant feed. It likewise becomes possible to swirl the oxygen fed in via the oxygen lances.

The additional swirling of the fed-in fuel and/or of the fed-in oxidant or oxygen results in an intensive radial mass exchange between the swirled flow and the flows adjacent to the latter. This intended interaction between the flows brings about an intensive and rapid intermixing and thus an accelerated reaction.

The swirling of the second fuel flow and of the second oxidant flow can be effected so that the two swirl flows are orientated in the same direction or in the opposite direction.

A countercurrent swirl, that is a swirl during which the swirl flows of the two flows are opposed to each other in the contact region of the two flows has the advantage that the flows are highly intensively intermixed. The chemical reaction is accelerated, i.e. quick, early ignition and combustion of the fuel take place. The swirling of the overall jet created after the confluence of the gas flows is relatively small since through the countercurrent swirl of the reaction jets the two original swirl flows partially cancel each other out. Because of this, the resultant flame flares relatively little.

However, it can also be favourable to orientate the two swirl flows so that they have a concurrent course. In this case the swirl flows in the contact region of the two flows intensify so that a relatively high overall swirl number is reached. This results in a greater flaring of the flame. The speed along the jet axis diminishes in the combustion zone and the dwell time of the reactants in the reaction chamber is increased.

In addition, with suitable swirl intensity, a return flow far distant from the burner tip can be created. This leads to a circulation flow through which the gases remain in the reaction chamber longer and are thus better converted. in particular, during the combustion of relatively low-calorific fuels, that is with a slowly progressing chemical reaction, a complete conversion of the fuel with the oxidant is thus achieved.

With concurrent swirling, the flame topology can be particularly adjusted. Axial length and radial expansion of the flame are selectable and adaptable to the reaction conditions. In addition, the intermixing of the two gas flows in the vicinity of the burner tip is not as intensive as with a countercurrent swirling of the jets, so that the thermal load of the burner tip is lowered.

The concurrent swirling additionally has the advantage that with desired overall swirl number the swirl of one of the two flows can be selected lower than is possible with a countercurrent swirling. When swirling a flow, the flow of necessity is subjected to a certain pressure loss. This pressure loss must preferably be kept low particularly when the flow concerned is available only at low pressure. Under these circumstances it is advantageous if the flow present at a low pressure is less swirled, but the flow present at higher pressure is swirled more intensively. Through the concurrent swirling of the two flows it is possible however to achieve the desired overall swirl number.

It is favourable when the means for creating a swirl in the second fuel feed and/or in the second oxidant feed comprise flow channels which are inclined tangentially against the flow direction. Such an embodiment of the means for swirl creation can be easily produced. By way of the angle of the flow channels the swirling of the flow can be easily predetermined. The swirling however can also be created via suitably orientated guide plates or guide blades in the second fuel feed or in the second oxidant feed, respectively. This embodiment is preferable if the pressure loss created through the swirling is to be minimised.

Preferentially, the means for creating a swirl in the second fuel feed and/or in the second oxidant feed are adjustable so that swirl flows of different intensities can be created. Through suitable selection of the swirl number, that is the intensity of the swirling of the gas flows involved, the flow conditions can be adapted to the combustion reaction taking place.

It has proved to be favourable to provide a third oxidant feed which is designed as a ring channel and surrounds the second oxidant feed. By way of the third oxidant feed, the same oxidant as via the first and the second oxidant feed is fed in. This is oxygen, air, air enriched with oxygen, a mixture of oxygen and carbon dioxide, a mixture of air and carbon dioxide or a mixture of oxygen, air and carbon dioxide.

Through the third oxidant feed the operationally safe regulating range of the burner is further enlarged. In addition, the burner emissions, particularly CO and $NO_x$, can be specifically influenced through the improved combustion control. The oxidant quantity fed in via the third oxidant feed for example amounts to 1.5 to 8 times the oxidant quantity fed in via the first oxidant feed.

It is additionally an advantage to provide a plurality of oxygen lances also in the third oxidant feed. The oxygen lances are arranged within the ring gap that serves as the third oxidant feed, preferentially at its inner or outer edge. By way of the oxygen lances, oxygen with a purity of more than 90% by volume, particularly of more than 95% by volume, or being technically pure oxygen, is fed in.

As explained above, it is favourable in practice to feed the same oxidant to each of the first, the second and the third oxidant feed. For better and more specific control of the combustion reaction it can, however, also be an advantage not to supply all oxidant feeds with the same oxidant, but at least partially use oxidants of different composition. Thus, the oxygen content of the oxidant flowing through the first oxidant feed can for example be selected higher than the oxidant flowing through the other two oxidant feeds.

The burner according to the invention is suitable for the combustion of solid, liquid and gaseous fuels. When using liquid fuels it has proved itself to provide the first fuel feed and/or the second fuel feed with means for atomising a liquid fuel. Through the atomisation of the fuel its surface area is enlarged and thus the reaction of the fuel with the oxidant accelerated and intensified.

Preferentially the flow velocity of the second oxygen-containing flow fed in via the second oxidant feed exceeds the flow velocity of the fuel flow fed in via the second fuel feed by more than 50%, preferentially by more than 75%, particularly preferably the flow velocity of the second oxygen-containing flow amounts to between 90% and 120% of the flow velocity of the second fuel flow. The flow velocity of the second oxygen-containing flow amounts to 1.5 times to 2.5 times the flow velocity of the second fuel flow, preferably approximately double the flow velocity of the second fuel flow. Through the different flow velocities shearing forces occur between the two adjacent flows, which result in an improved intermixing of the fuel with the oxidant.

The absolute flow velocity of the second fuel flow amounts to between 20 and 50 m/s, while the flow velocity of the second oxygen-containing flow lies between 20 and 70 m/s.

BRIEF DESCRIPTION OF THE DRAWINGS

The invention as well as further details of the invention are explained in more detail in the following by means of the exemplary embodiments shown in the drawing Figures.

DETAILED DESCRIPTION OF THE INVENTION

Figure 1:
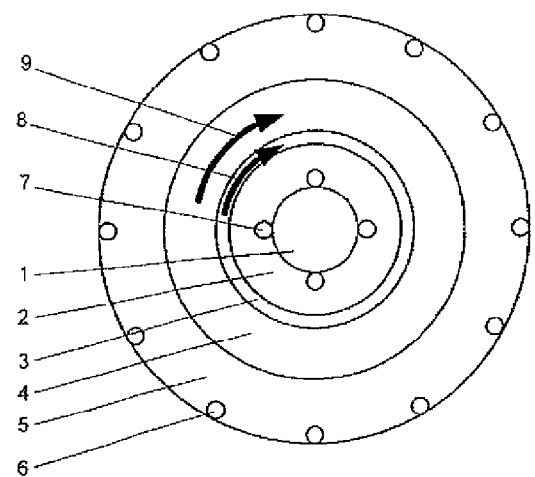
FIG. 1 schematically shows a cross section through a burner head according to the invention, and FIG. 2 schematically shows another embodiment of the burner head shown in FIG. 1.

The burner shown in FIG. 1 is for the combustion of low-calorific fuels, for example of a mixture of wood and coal. The burner has a plurality of tubes of different diameter arranged coaxially to each other, wherein the central tube 1 and the ring gaps 2, 3, 4, 5 forming between the other tubes serve as fuel or oxidant feed. The tubes are orientated parallel to one another so that the flows fed in to each also exit the tube 1 or the ring gaps 2, 3, 4, 5 parallel to one another.

The tubes 1, 3 are for the feeding of fuel. A fuel source is connected to the central tube 1 and the ring gap 3 from which the tube 1 serving as first fuel feed and the ring gap 3 serving as second fuel feed are supplied with fuel. In the ring gap 3, means for generating a swirl flow are provided. To this end, flow channels are provided in the ring gap 3 which are tangentially inclined against the main flow direction, i.e. against the axial extension of the burner or of the tube 1, and the gaps 2, 3, 4, 5. In this manner, a rotary movement component 8 is imposed on the second fuel flow flowing through the ring gap 3, which causes the second fuel flow to flow on a helical path.

Via the ring gaps 2, 4, 5 an oxidant is fed in. Air with oxygen or a mixture of oxygen and carbon dioxide is used as oxidant. The composition of the oxidant can be varied as a function of the desired burner output and flame geometry.

Analogously to the swirling of the second fuel flow, suitable means for the swirling of the oxidant flow are also provided in the ring gap 4. The oxidant flow is put into a rotary motion 9 through suitable installations such as for example flow channels, guide blades or guide plates which preferentially has the same direction of rotation as the rotary movement 8 of the second fuel flow.

In the ring gap, oxygen lances 7 are located evenly distributed over the outer circumference of the tube 1. Twelve further oxygen lances 6 are equidistantly arranged likewise along the inner circumference of the outermost ring gap 5. All oxygen lances 6, 7 are connected to an oxygen source, via which the oxygen lances 6, 7 are supplied with oxygen having a purity of more than 98% by volume.

The fuel feed according to the invention takes place in two parts: a first part of the fuel is fed in via the central tube 1. The remaining fuel is directed via the ring gap 3 where it is swirled, i.e. provided with an additional rotary component. The ratio of the fuel quantities fed in via the central tube 1 and via the ring gap 3 preferentially is 2 to 1 (2:1).

As oxidant, a mixture of oxygen and carbon dioxide is used for example. Advantageously, an amount of oxygen resulting in the carbon dioxide flow having an oxygen content of 15 to 25% by volume is added to the carbon dioxide. The oxidant feed is distributed over the gaps 2, 4, 5, wherein, as explained above, the oxidant flowing through the ring gap 4 is subjected to swirling. The division of the entire oxidant over the gaps 2, 4, 5 is effected at a ratio of 2 to 3 to 5 (2:3:5). In addition, oxygen is nozzle-injected via the oxygen lances 6, 7. Advantageously, these oxygen flows are likewise subjected to swirl, that is an additional rotary movement component is imposed on the oxygen flows.

The division of the fuel and oxygen feed over a plurality of separate feeds through the tubes, gaps and lances, 1, 2, 3, 4, 5, 6, 7, respectively according to the invention, and the swirling of the second fuel flow at the gap 3, of the oxidant flow at the gap 4 and of the nozzle-injected oxygen flows at the lances 6, 7 allows optimal combustion control. The flame characteristic can be set and optimised independently of the current burner output. The flame stability is substantially improved.

Through the swirling of the flows at the gaps 3, 4, and the lances 6, 7 a particularly sound mixing-through of these flows with adjacent flows at the tube 1, and the gaps 2, 5 is achieved. Altogether, the reaction conditions are improved as a result. By way of the inner oxygen lances 7, additional oxygen can be fed in as oxidant, when for example the oxygen content in the oxidant fed in via the ring gap 2 is too low to guarantee even and stable combustion.

Figure 2:
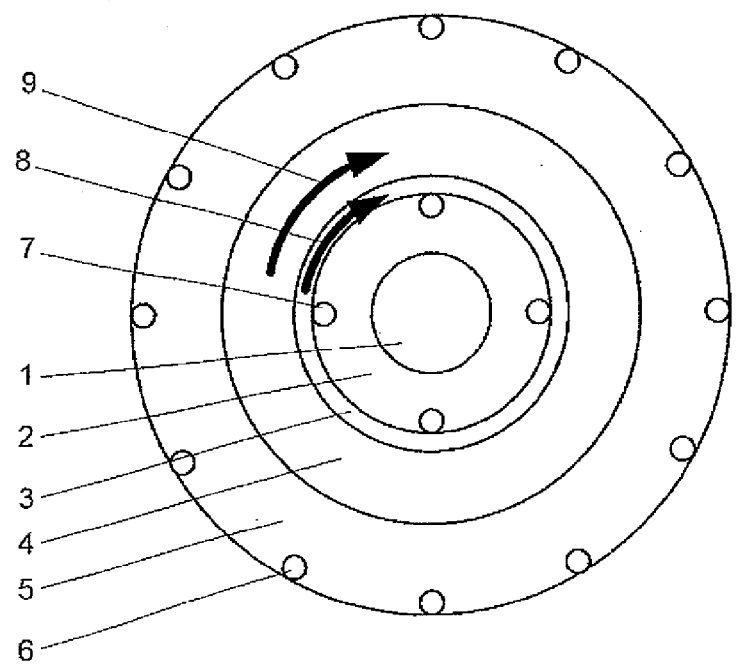

The embodiment according to FIG. 2 differs from that according to FIG. 1 merely in that the oxygen lances 7 arranged in the ring channel are not provided on its inner edge, but on the outer edge of the ring channel 2.

What is claimed is:

1. A burner with a first fuel feed and with a first oxidant feed surrounding the first fuel feed in the shape of a ring, comprising a second fuel feed arranged about the first oxidant feed in the shape of a ring; a second oxidant feed arranged about the second fuel feed in the shape of a ring; and a plurality of oxygen lances having a radial distance from a centre of the burner less than a radial distance of the second fuel feed from the centre of the burner.

2. The burner according to claim 1, further comprising a third oxidant feed constructed and arranged as a ring channel surrounding the second oxidant feed.

3. The burner according to claim 2, further comprising a plurality of outer oxygen lances located within the ring channel for forming the third oxidant feed.

4. The burner according to claim 1, further comprising means for generating a swirl of a substance through at least one of the second fuel feed, the second oxidant feed, and the plurality of oxygen lances.

5. The burner according to claim 1, further comprising means for atomizing a liquid fuel for at least one of the first fuel feed and the second fuel feed.

6. The burner according to claim 1, further comprising means for generating a swirl of a gas flowing through said means.

7. A method for the chemical conversion of a fuel with an oxygen-containing gas by means of a burner, wherein the fuel is fed in to the burner and is converted with a first flow of an oxygen-containing gas surrounding the fuel flow, comprising a second fuel flow surrounding the first oxygen-containing flow as a fuel envelope flow; and a second oxygen-containing flow surrounding the second fuel flow as an oxygen envelope flow; and injecting a plurality of oxygen flows by a nozzle into the first oxygen-containing flow.

8. The method according to claim 7, comprising providing a swirl flow on to at least one of the second oxygen-containing flow, the second fuel flow and the plurality of oxygen flows.

9. The method according to claim 8, wherein the swirl flow provided to the second oxygen-containing flow and the second fuel flow are concurrent.

10. The method according to claim 7, wherein a flow velocity of the second oxygen-containing flow exceeds a flow velocity of the second fuel flow by more than 50% of the flow velocity of the second fuel flow.

11. The method according to claim 7, wherein the fuel for conversion is selected from the group consisting of liquid fuel, solid fuel, coal, brown coal and wood.

12. The method according to claim 7, wherein at least one of the first oxygen-containing flow and the second oxygen-containing flow comprises a mixture of oxygen and carbon dioxide.

* * * * *